Walker & Leseman,
Scrubber.

No. 110,409.   Patented Dec. 20, 1870.

Witnesses,
J. E. Hutchinson
C. L. Evert

Inventor.
Wm. P. Walker
Ernest H. Leseman
per
Alexander Mason
Atty.

United States Patent Office.

WILLIAM PENN WALKER AND ERNEST HENRY LESEMAN, OF TOLEDO, OHIO.

Letters Patent No. 110,409, dated December 20, 1870.

IMPROVEMENT IN SCRUBBERS AND MOPS.

The Schedule referred to in these Letters Patent and making part of the same.

*To all whom it may concern:*

Be it known that we, WILLIAM PENN WALKER and ERNEST HENRY LESEMAN, of Toledo, in the county of Lucas and in the State of Ohio, have invented certain new and useful Improvements in Rubber Scrubbers and Mops; and do hereby declare that the following is a full, clear, and exact description thereof, reference being had to the accompanying drawing and to the letters of reference marked thereon making a part of this specification.

The nature of our invention consists in the construction and arrangement of a rubber scrubber and mop, as will be hereinafter fully set forth.

In order to enable others skilled in the art to which our invention appertains to make and use the same, we will now proceed to describe its construction and operation, referring to the annexed drawing, in which—

Figure 1:
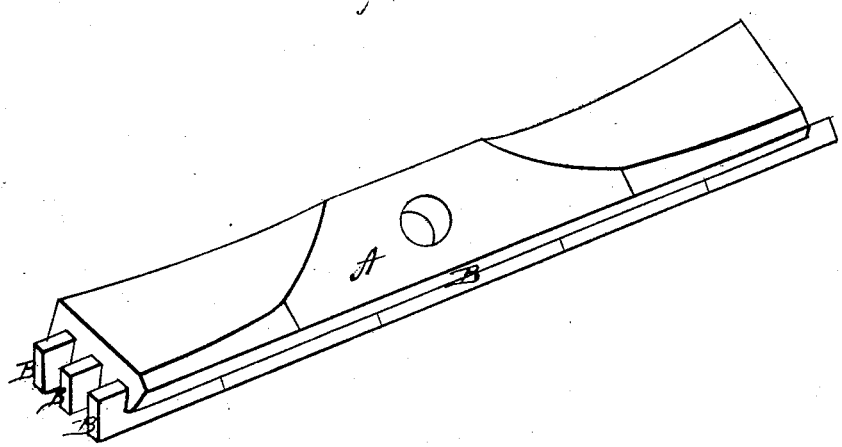
Figure 2:
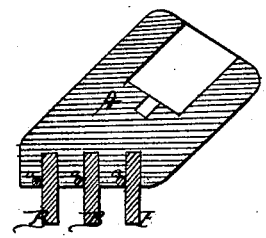

Figure 1 is a perspective view, and
Figure 2 is a transverse vertical section.

A represents the mop-head, constructed as shown in the drawing, so as to be on the same plane as the handle when this is inserted in the head.

The head A may be used with or without a handle; the one without a handle to be used as a hand-scrubber for shelves, stairs, casings, &c.

In the under side of the head A is made any desired number of square grooves running the entire length of the head, in which grooves rubber strips B B are inserted, said strips projecting beyond the ends of the head to facilitate use in corners.

Each of these rubber strips B is fastened by means of one or more rods, *a*, which may be either round, square, or other shape, and made of wood, metal, or other suitable material.

These rods are inserted in small side grooves, that is, small grooves cut in the sides of the main groove where the rubber is placed.

We may use but one side groove to each rubber strip, in which one-half of the rod will be placed, the other half being forced into the elastic substance of the rubber; or we may use two side grooves, one for the rod and the other directly opposite, allowing the rubber to be forced into it.

By this means we have a perfect and continuous fastening, superior to nails and other modes now in use, being more easily made and replaced when required.

This mode of fastening rubber in grooves may be applied for other purposes also as well as for scrubbers.

The rubber strips B B are cut in the edges, as shown in fig. 1, for a suitable distance, allowing the rubber to adapt itself more easily to uneven surfaces.

Having thus fully described our invention,
What we claim as new, and desire to secure by Letters Patent, is—

1. The method herein described, of fastening rubber strips in grooves by means of one or more side grooves and rods to each strip, substantially as herein set forth.

2. The combination of the head A and rubber strips B B, when said strips extend beyond the end of the head, have their lower edges cut at suitable intervals, and are fastened in the head by the rods *a*, all substantially as herein set forth.

In testimony that we claim the foregoing we have hereunto set our hands this 12th day of November, 1870.

WILLIAM PENN WALKER.
ERNEST HENRY LESEMAN.

Witnesses:
C. L. EVERTS,
H. J. RAFFENSPERGER.